US005160778A

United States Patent [19]

Hashimoto et al.

[11] Patent Number: 5,160,778

[45] Date of Patent: Nov. 3, 1992

[54] TRANSFER SHEET FOR MARKING

[75] Inventors: Sadaaki Hashimoto, Chofu; Takeshi Tomiyama, Hiratsuka, both of Japan

[73] Assignee: Kansai Paint Company, Limited, Amagasaki, Japan

[21] Appl. No.: 451,820

[22] Filed: Dec. 15, 1989

[30] Foreign Application Priority Data

Dec. 21, 1988 [JP] Japan ................................ 63-322450

[51] Int. Cl.5 ................................................ B32B 9/00

[52] U.S. Cl. ...................................... 428/195; 428/29; 428/40; 428/913

[58] Field of Search ..................... 428/29, 40, 195, 76, 428/914, 913

[56] References Cited

U.S. PATENT DOCUMENTS

| | | | |
|---|---|---|---|
| 3,896,249 | 7/1975 | Keeling et al. | 428/202 |
| 3,985,602 | 10/1976 | Stuart | 421/29 |
| 4,677,015 | 6/1987 | Ito et al. | 428/201 |
| 4,678,690 | 7/1987 | Palmer et al. | 428/40 |

*Primary Examiner*—Patrick J. Ryan
*Assistant Examiner*—W. Krynski
*Attorney, Agent, or Firm*—Armstrong & Kubovcik

[57] ABSTRACT

The present invention provides a transfer sheet for marking which comprises a base sheet, a releasant layer, a layer of printed design or like marking (printed layer), a layer of pressure-sensitive adhesive and a release sheet, all superposed in this sequence, the transfer sheet being characterized in that an application film consisting of a film and an adhesive layer is provided over the exposed surface of the printed layer after removing the base sheet and the releasant layer from the transfer sheet.

4 Claims, 4 Drawing Sheets

TRANSFER SHEET FOR MARKING

BACKGROUND OF THE INVENTION

The present invention relates to a novel transfer sheet for marking.

Transfer sheets for marking are widely used which are applied to the surface of a substrate such as buildings, vehicles, implements, machinery or equipment to form a colored film of desired shape for transfer of a design or like marking to the surface thereof.

Conventional transfer sheets comprise a base sheet, a releasant layer, a layer of printed design or like marking (hereinafter referred to as "printed layer"), a layer of pressure-sensitive adhesive and a release sheet, all superposed in this sequence (e.g. Japanese Unexamined Utility Model Publication No.72,097/1988). For transfer, the transfer sheet is applied to a substrate by removing the release sheet, pressing the exposed pressure-sensitive adhesive layer against the substrate surface portion to be marked, and separating the releasant layer and the base sheet from the printed layer.

However, conventional transfer sheets have drawbacks. With the exposed pressure-sensitive adhesive layer directed to a substrate, the conventional transfer sheet is applied to the substrate surface by pressing the external surface of base sheet toward the substrate initially at one end thereof and then progressively in a constant direction to adhere the pressure-sensitive adhesive layer to the substrate. Yet the conventional transfer sheet thus attached to the substrate remains unfixed at the sheet portions where no transfer has taken place. In this case, because the transfer sheet is adhered to the substrate only between the adhesive and the substrate, the displacement of marking and formation of bubbles tend to occur on the adhered portions, deteriorating the appearance of the marking. Further disadvantageously, the conventional transfer sheets are difficult to position when applied to a substrate, particularly at the start of application, hence low in the application efficiency.

SUMMARY OF THE INVENTION

It is an object of the present invention to provide a novel transfer sheet for marking free of the foregoing drawbacks of conventional transfer sheets for marking.

It is another object of the invention to provide a novel transfer sheet for marking which is capable of forming markings with excellent appearance without displacement nor formation of bubbles and which can be applied to a substrate with high efficiency since one end of the sheet is easily positioned particularly at the start of its application to the substrate.

These and other objects of the present invention will become apparent from the following description.

According to the present invention, there is provided a transfer sheet for marking which comprises a base sheet, a releasant layer, a printed layer, a layer of pressure-sensitive adhesive and a release sheet, all superposed in this sequence, the transfer sheet being characterized in that an application film consisting of a film and an adhesive layer is provided over the exposed surface of the printed layer after removing the base sheet and the releasant layer from the transfer sheet.

To obviate the defects of conventional transfer sheets, the foregoing objects of the invention can be achieved by applying the above-specified application film onto the exposed surface of the printed layer after separating the base sheet and the releasant layer from the printed layer.

The present invention has been accomplished based on this novel finding.

BRIEF DESCRIPTION OF THE DRAWINGS

FIG. 1 schematically shows a transfer sheet (a) comprising a base sheet 1, a releasant layer 2, a printed layer 3, a layer of pressure-sensitive adhesive 4 and a release sheet 5, all superposed in this sequence and a transfer sheet (c) according to the invention formed from the transfer sheet (a) by separating the base sheet 1 and the layer 2 from the printed layer 3 as shown in (b) and applying to the exposed layer 3 an application film 8 consisting of a film 6 and an adhesive layer 7. FIG. 2 schematically shows a transfer sheet (d) comprising a base sheet 1, a releasant layer 2, a clear layer 3' optionally formed, a printed layer 3, a pressure-sensitive adhesive layer 4 and a release sheet 5, all superposed in this sequence and a transfer sheet (f) according to the invention formed from the transfer sheet (d) by separating the base sheet 1 and the layer 2 from the clear layer 3' as shown in (e), and applying the application film 8 to the exposed layer 3'.

Figure 1:
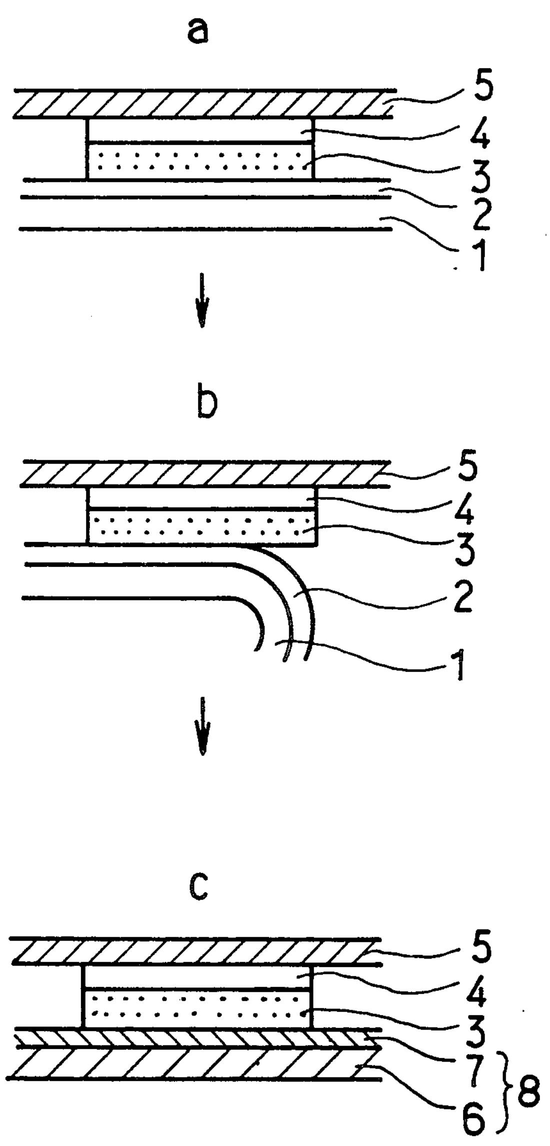
FIGS. 1 and 2 are sectional views schematically showing examples of transfer sheets for marking according to the invention.

Before separating the base sheet 1 and the layer 2 from the transfer sheet (a) or (d), more specifically from the printed layer 3 or the clear layer 3', the transfer sheet is preferably pressed externally thereof. The pressure can be applied by moving a squeegee over the outer surface of base sheet 1 to press the layers 3 and 4 against the release sheet 5. As a result, the release sheet 5 is caused to stick to the layer 4 with such increased adhesive strength that the base sheet 1 and the layer 2 may be readily separated from the printed layer 3 or clear layer 3'. The adhesive strength between the release sheet 5 and the layer 4 denotes the adhesive strength resulting from the application of pressure.

The components constituting the transfer sheet of the invention will be described below in detail.

The base sheet 1 is of paper, synthetic film or the like, and has a thickness determined so that the transfer sheet has the required elasticity. The base sheet 1 is intended to protect the surface of the printed layer.

The releasant layer 2 is attached to the base sheet 1. The adhesive strength between the printed layer 3 or clear layer 3' and the layer 2 is adjusted to lower than between the release sheet 5 and the layer 4 in order to facilitate the separation of layer 3 or 3' from the layer 2.

The layer 2, if capable of meeting the foregoing adhesive strength requirement, is not specifically limited and can be made of any conventional resins. Preferably usable as such layer are layers of amino resin-curable silicone-modified alkyd resin, usually layers formed by applying to the base sheet a solution of silicone-modified alkyd resin and an amino resin in an organic solution, followed by baking for curing, the silicone-modified alkyd resin being one prepared by modifying a conventional alkyd resin with a known intermediate for silicone resin. When required, a commonly employed curing catalyst such as p-toluenesulfonic acid is preferably added to the solution. Examples of useful organic solvents are toluene, xylene and like aromatic solvents, acetic acid-3-methoxybutyl and like ester solvents, diisobutyl ketone and like ketone solvents, etc.

Given below are examples of the components for amino resin-curable silicone-modified alkyd resin. Examples of useful oils include conventional non-drying or semi-drying fats and oils or fatty acids thereof useful for common alkyd resins, such as coconut oil, rice bran oil, safflower oil and soybean oil and the fatty acids thereof. Examples of useful polyol components include those conventionally used for alkyd resins such as propylene glycol, ethylene glycol, glycerin, pentaerythritol and the like. Examples of useful acid components include those conventionally used for alkyd resins such as phthalic anhydride, isophthalic acid, maleic anhydride, benzoic acid and the like. Useful silicone resins for modification include conventional intermediates for silicone resins, preferably those containing hydroxyl silane, alkoxyl silane or like reactive group in the molecule. Specific examples of useful intermediates for silicone resins are DCZ-6018 (trademark, product of Dow Corning Ltd.), DC-3037 (trademark, product of Dow Corning Ltd.), KR-218 (trademark, product of Shin-etsu Chemical Co., Ltd.), SF-8427 (trademark, product of Toray Silicone Co., Ltd.), etc.

The silicone-modified alkyd resin can be synthesized from the materials exemplified above by the conventional process. Preferred silicone-modified alkyd resins contain about 1 to about 5% by weight of silicone resin and has an oil length of about 10 to about 40% by weight. If the resin used is higher in silicone resin content than the above range, the separation of base sheet tends to result during storage, whereas if the resin used is lower in silicone resin content than the above range, the base sheet is difficult to separate after application of transfer sheet to the substrate.

Of useful amino resins, aminoaldehyde resins is preferred. Representative examples of amino components are melamine, urea, benzoguanamine, acetoguanamine, steroguanamine, spiroguanamine, etc. Also usable are almost all kinds of aminoaldehyde resins commonly employed for coating compositions and ethers thereof among which melamine formaldehyde is most preferred in view of its high weatherability.

The ratio by weight of silicone-modified alkyd resin to amino resin is approximately 5:5 to 9:1 (calculated as solids).

An inorganic powder or organic powder may be incorporated into the releasant layer 2 to adjust the gloss of the printed layer 3 and to vary the adhesive strength between the printed layer 3 and the releasant layer 2. Examples of useful inorganic powders are powders of silica, clay, talc, calcium carbonate, barium sulfate or the like. Examples of useful organic powders are powders of polyethylene, polypropylene, polyamide, polyacrylate, polyfluoride or the like. These powders have an average particle size of about 0.5 to about 80 μm, preferably about 2 to about 35 μm. While variable depending on the desired gloss of the printed layer 3 or adhesive, strength between the printed layer 3 and the releasant layer 2, the proportion of the powder in the releasant layer 2 is usually in the range of about 0.1 to about 50% by weight, preferably about 0.5 to about 20% by weight (calculated as solids).

A solution of silicone-modified alkyd resin and amino resin in an organic solvent or a dispersion of said powder in the solution is applied onto the surface of the base sheet 1 by a roll coater or the like to a dry thickness of about 3 to about 100 μm, and the coating layer is baked at a temperature of about 120° to about 170° C. for about 20 to about 60 seconds to provide a cured releasant layer 2. In this case, when required a primer such as polyester-type primer or the like may be applied to the base sheet to a dry thickness of about 2 to about 5 μm to increase the adhesive strength between the releasant layer 2 and the base sheet 1.

The printed layer 3 is formed on the releasant layer 2 over the base sheet 1 by printing the desired design, letters or the like employing, e.g. screen printing for partial printing or a roll coater for entire printing. The printed layer 3 comprises a vehicle component containing a usual coloring pigment. A preferred vehicle component is one prepared by copolymerizing a vinyl-type monomer mixture essentially containing a hydroxyl-containing vinyl monomer and crosslinking the resulting copolymer, i.e. a vinyl-type resin of about 5° to about 80° C. in glass transition temperature, with aliphatic polyisocyanate. The vehicle component is effective in giving a printed layer outstanding in properties such as flexibility, ductility and the like and in sustained aesthetic properties, particularly gloss, gloss retention, surface smoothness and the like. Useful vehicle components include, for example, those prepared by copolymerizing a vinyl-type monomer mixture containing about 1 to about 50% by weight of a hydroxyl-containing vinyl-type monomer such as 2-hydroxyethyl acrylate or methacrylate, and crosslinking the resulting copolymer, i.e. a vinyl-type resin of about 5° to about 80° C. in glass transition temperature, with a curing agent such as aliphatic polyisocyanate, preferably tetramethylene diisocyanate, hexamethylene diisocyanate or like long-chain aliphatic polyisocyanate. A layer of a resin with a glass transition temperature of less than 5° C. tends to become soft and subject to mar, and a layer of a resin with a glass transition temperature of higher than 80° C. is likely to become hard and brittle, hence undesirable. Proper proportions of vinyl-type resin and aliphatic polyisocyanate are in such range that the equivalent amount of isocyanate group per mole of hydroxyl group is about 0.5 to about 2.0.

Other vehicle components for the printed layer 3 than the foregoing hydroxyl-containing vinyl polymer/polyisocyanate compound include, for example, curable resins such as polyester polyol/polyisocyanate compound, hydroxyl-containing vinyl polymer/melamine resin, and polyester polyol/melamine resin, and thermoplastic resins such as acrylic resins and polyester resins.

A suitable thickness of the printed layer 3 is about 10 to about 50 μm. The coating layer applied is properly dried at a temperature of about 60° to about 100° C. for about 10 to about 60 minutes.

Figure 2:
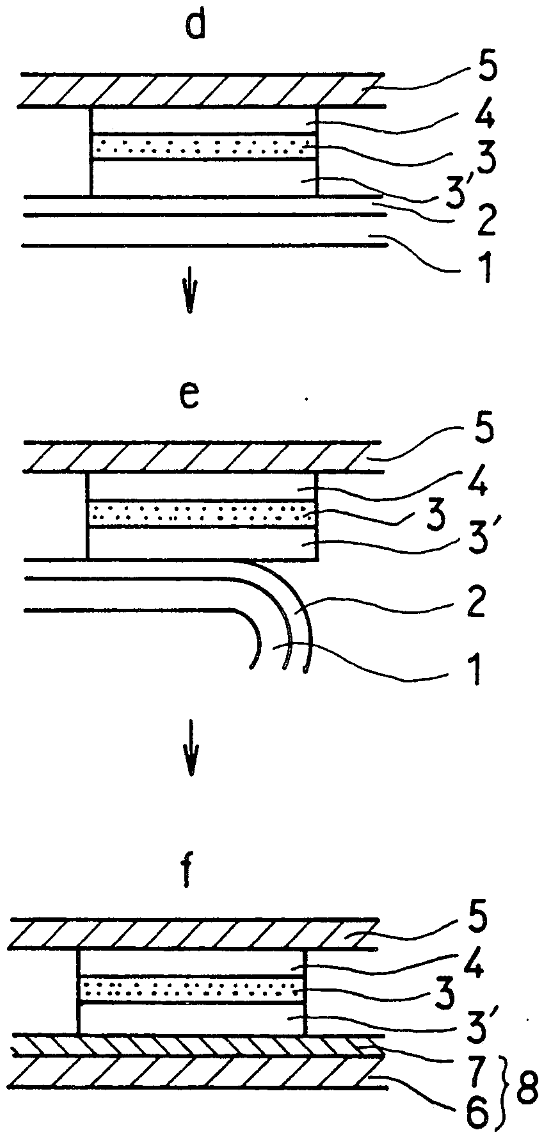

The printed layer 3 may contain a metallic pigment powder such as particulate aluminum or the like in addition to a usual coloring pigment to impart a metallic color to the marking formed from the transfer sheet. In this case, a clear layer 3' is preferably formed between the metallic printed layer 3 and the releasant layer 2 as shown in FIG. 2 in order to avoid the discoloration of metallic pigment powder. The clear layer 3' can be produced in the same manner as done for the printed layer 3 with the exception of not using a coloring pigment. In case the clear layer 3' is formed, the application film 8 is applied onto the surface of clear layer 3' as shown in FIG. 2.

The pressure-sensitive adhesive layer 4 can be produced by applying an adhesive, e.g. conventional adhesives for transfer sheets, employing a roll coater or screen printing, followed by drying. Examples of useful adhesives are those commonly used such as natural rubber-type, modified rubber-type, synthetic rubber-type, polyacrylate-type, cellulose-type, polyvinyl acetate-type, polyester-type, polyvinyl chloride/polyvinyl acetate-type, polyvinyl ether, polyvinyl butyral and the like. The adhesive is used in the form of either a solution or an emulsion.

A suitable dry thickness of the pressure-sensitive adhesive layer 4 is usually about 10 to about 40 μm. The applied coating layer is properly dried at a temperature of about 50° to about 90° C. for about 10 to about 30 minutes.

The release sheet 5 can be any of sheets conventionally employed for transfer sheets. Among useful release sheets are sheets of paper and films of materials treated with a known releasant including silicone, wax, polyolefin, fluorine-containing resin, alkyd resin or the like to impart a high releasability and films of synthetic resin having releasability itself such as polypropylene or polyethylene.

The application film 8 applied to the printed layer 3 or the clear layer 3' has a higher adhesive strength therebetween than between the release sheet 5 and the pressure-sensitive adhesive layer 4 in order to make the layer 4 readily separable from the release sheet 5. After removal of the release sheet 5 from the layer 4, the transfer sheet is applied to the substrate surface by pressing the application film 8 externally thereof to adhere the layer 4 to the substrate, followed by removing the application film 8. For easy separation of application film 8, the adhesive strength between the layer 7 and the printed layer 3 or clear layer 3' is made smaller than between the substrate and the layer 4.

The application film 8 consists of the film 6 and adhesive layer 7 and is removably applicable. Examples of the film 6 include conventional films meeting the foregoing requirements, and include films of fibers such as paper, Japanese paper, unwoven fabric, woven fabric, etc. and plastics such as polyvinyl chloride, polyester, polyethylene, polyvinyl chloride/polyvinyl acetate, polyethylene/polybutylene, polyethylene/polyvinyl acetate, polyethylene/alkyl polyacrylate, cellulose acetate, cellophane, etc. The film 6 has a thickness of about 30 to about 150 μm, preferably about 50 to about 80 μm in view of the balance between high application efficiency and costs. Examples of useful adhesives for the application film 8 include those exemplified above for the pressure-sensitive adhesive layer 4. The adhesive is usually applied to a dry thickness of about 15 to about 50 μm.

Figure 3:
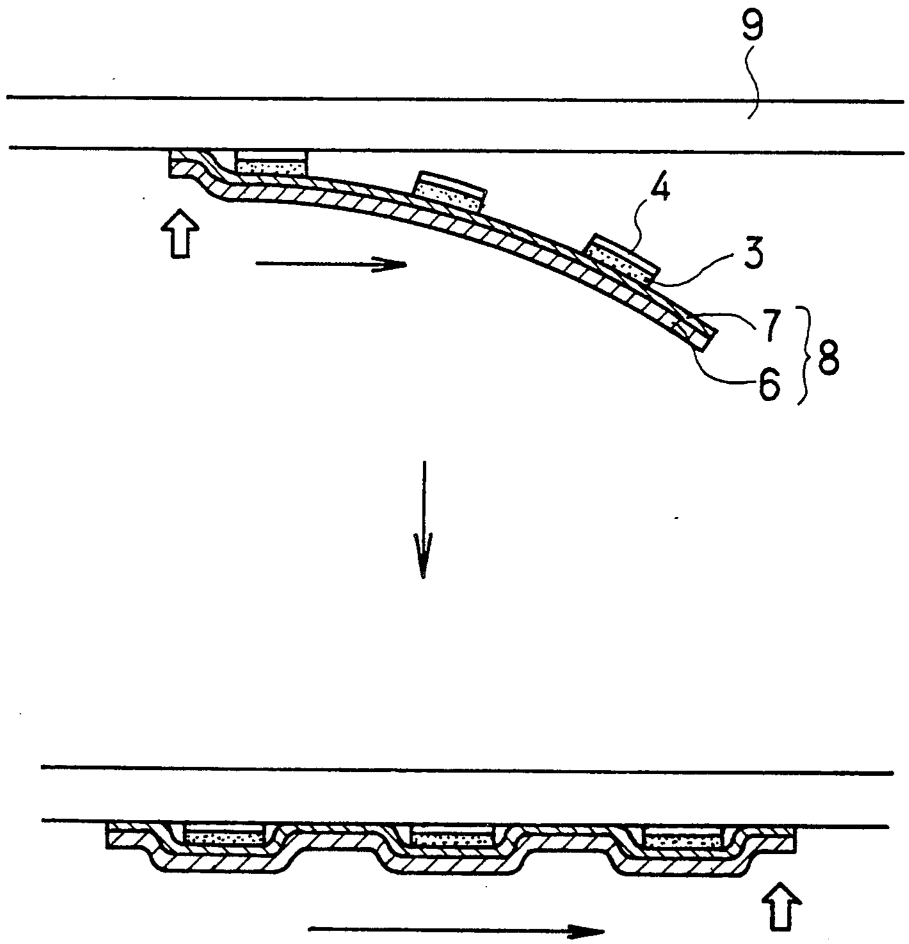

The transfer sheet of the invention is applied to a substrate in the manner shown in the sectional views of FIG. 3. Stated more specifically, after the release sheet 5 has been separated from the pressure-sensitive adhesive layer 4 of the transfer sheet as it is or as cut to the desired shape, there is applied to the substrate 9 the transfer sheet having the remaining components, i.e. the layer 4, printed layer 3, clear layer 3' optionally formed (not shown) and application film 8 (film 6 and adhesive layer 7). This application is done by pressing the application film 8 externally thereof toward the substrate 9 while the layer 4 is directed to the surface of the substrate 9, whereby the printed layer 3, clear layer 3' optionally formed and layer 4 are applied to the substrate 9 to transfer thereto the desired design or like marking. Thereafter the application film 8 is separated from the printed layer 3 or clear layer 3'. In FIG. 3, white thick arrow symbols (arrows directed upward) designate the location for positioning the transfer sheet being applied, and thin arrow symbols (arrows directed rightward) indicate the direction of application. FIG. 3 shows that the application film 8 enables the transfer sheet to become securely adhering to the substrate 9 because of the presence of adhesive layer 7, thereby facilitating the positioning of the transfer sheet and preventing the displacement of marking and the formation of bubbles.

Figure 4:
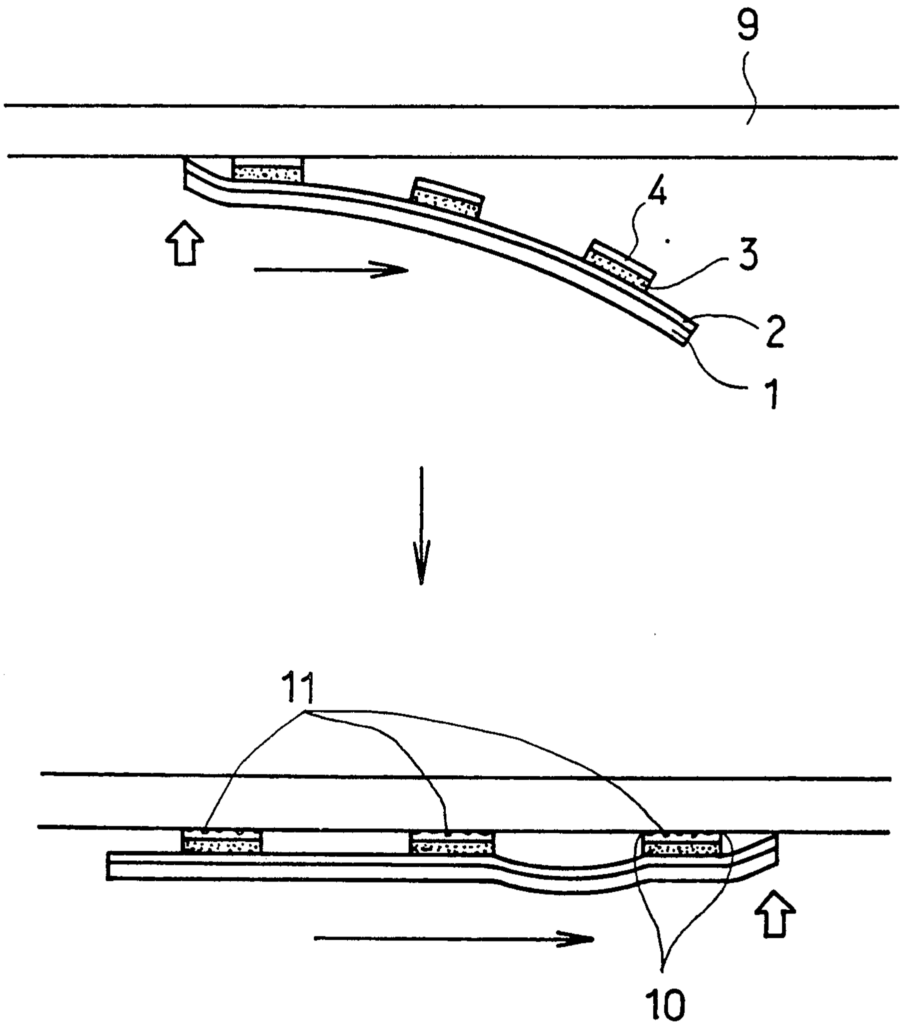

On the other hand, the conventional transfer sheets are defective in the following. Since the releasant layer 2 adjacent to the base sheet 1 has no cohesion as shown in the sectional views of FIG. 4, the transfer sheet is difficult to position, possibly resulting in occurrence of displacement 10 and formation of bubbles 11 in marked portions. The reference numerals 3, 4 and 9 in FIG. 4 designate the counterparts in FIG. 3, and the arrow symbols in FIG. 4 carry the same meanings as in FIG. 3.

Substrates to be applied with the transfer sheet of the invention are not specifically limited and include, for example, substrates made of metals, concrete, glass or like inorganic materials, or plastics or like organic materials and such substrates covered with coating.

The transfer sheet of the invention comprises components sticking to each other with the following adhesive strength respectively as described hereinbefore. (1) The adhesive strength (A) between the the releasant layer 2 and the printed layer 3 or clear layer 3' is lower than the adhesive strength (B) between the release sheet 5 and the pressure-sensitive adhesive layer 4. (2) The adhesive strength (B) is lower than the adhesive strength (C) between the adhesive layer 7 of the application film 8 and the printed layer 3 or clear layer 3'. (3) The adhesive strength (C) is lower than the adhesive strength (D) between the substrate and the pressure-sensitive adhesive layer 4. The transfer sheet of the invention comprises the components meeting the foregoing adhesive strength requirements and can be formed and applied more easily because of this feature. The required range of each adhesive strength is variable depending on the utility of the transfer sheet and kinds of the substrate to be used. Shown below are specific ranges thereof as determined by a tensile tester (used under the conditions: atmosphere at 20° C. and RH 80%, speed 40 mm/min, product of Toyo Baldwin Co., Ltd.) using samples of 25 mm in width. The adhesive strength (A) is about 1.0 to about 2.4 g, preferably about 1.0 to about 2.0 g; the adhesive strength (B) is about 2.5 to about 20 g, preferably about 1.9 to about 15 g; the adhesive strength (C) is about 30 to about 300 g, preferably about 50 to about 200 g; and the adhesive strength (D) is about 500 to about 1,300 g, preferably about 700 to about 1,000 g.

The transfer sheet of the invention can be readily positioned on a substrate by the application film 8 applied to the exposed surface of pressure-sensitive adhesive layer after separating the release sheet from the pressure-sensitive adhesive layer. Consequently the transfer sheet can be easily applied to a curved substrate as well as a planar substrate free of displacement of marking or other problem. The application film 8 can stick to a substrate with proper adhesion thereto, permitting the transfer sheet to attach to the substrate so that the desired marking is formed with excellent aesthetic properties without displacement nor formation of bubbles otherwise occurring in pressing the transfer sheet against the substrate. Further the transfer sheet of the invention can be conveniently produced using a conventional transfer sheet by a simple method.

The present invention will be described below in greater detail with reference to the following examples and comparative example.

EXAMPLES 1 to 4

Four transfer sheet specimens according to the invention having the components shown in FIG. 1 (c) were prepared by the following procedure.

A transparent polyethylene terephthalate film of 75 μm thickness (product of Toyo Spinning Co., Ltd.) was used as a base sheet.

A releasant layer was formed in the following manner. A silicone-modified alkyd resin was prepared by reacting the components shown in Table 1 (components I through IV were used in Examples 1 to 4, respectively) by the conventional process. One hundred parts by weight of the obtained silicone-modified alkyd resin was diluted with 35 parts by weight of toluene to make a varnish. To the varnish were added 30 parts by weight of amino resin (trademark "CYMEL 327", product of Mitsuitoatsu Chemicals, Inc.) and 1 part by weight of p-toluenesulfonic acid, giving a releasant. The obtained releasant was applied to the base sheet by a roll coater to a dry thickness of about 10 μm. The coating layer was baked at 150° C. for 30 seconds by a far-infrared hot-air dryer to give a releasant layer.

Next, a printed layer was formed on the releasant layer as follows. Acrylpolyol (60% by weight of solids, product of Kansai Paint Co., Ltd., trademark "Retan PG-60 White Base") 42° C. in glass transition temperature was prepared by copolymerizing a vinyl monomer mixture consisting of 30% by weight of styrene, 25% by weight of methyl methacrylate, 25% by weight of n-butyl acrylate, 19% by weight of 2-hydroxyethyl methacrylate and 1% by weight of acrylic acid. Using a printing ink comprising 100 parts by weight of the obtained acrylpolyol, 30 parts by weight of hexamethylene diisocyanate-type curing agent (75% by weight of solids) and 10 parts by weight of ethyl cellosolve, printing was effected on the entire surface of releasant layer by a roll coater to form a layer of 30 μm dry thickness. The coating layer was heated at 80° to 90° C. for 15 minutes to give a cured printed layer.

A pressure-sensitive adhesive layer was formed by subjecting to screen printing an acrylic resin-type pressure-sensitive adhesive (trademark "Sericoll CAT1100S", product of Teikoku Ink Mfg. Co., Ltd.) on the entire surface of printed layer to give a film about 20 μm in dry thickness. The coating layer was heated at 80° C. for 15 minutes to give a pressure-sensitive adhesive layer.

The transfer sheet specimen like that shown in FIG. 1 (a) was produced by superposing a silicone-coated kraft paper sheet weighing 80 g/m$^2$ as a release sheet on the layers.

The obtained transfer sheet was subjected to pressure by moving a squeegee over the surface of the base sheet. The base sheet and the releasant layer were removed and the application film shown in Table 2 was applied to the exposed printed layer to provide a transfer sheet specimen according to the present invention. In this way, four kinds of transfer sheet specimens were formed (Examples 1 to 4). After removal of release sheet, the specimen was pressed against an aluminum panel as a substrate with the pressure-sensitive adhesive layer directed thereto to achieve a uniform and sufficient contact bonding. The application film was removed to form a marking film on the surface of the aluminum panel.

Table 2 shows the results.

Comparative Example 1

The transfer sheet resembling that shown in FIG. 1 (a) and obtained as an intermediate in Example 1 was applied to a substrate in the manner as described below. The release sheet was separated from the transfer sheet, and the transfer sheet was pressed against an aluminum panel as a substrate with the exposed pressure-sensitive adhesive layer directed thereto. The base sheet and the releasant layer were removed to form a marking film on the surface of the aluminum panel.

Table 2 shows the results.

TABLE 1

| | Component | | | |
|---|---|---|---|---|
| | I | II | III | IV |
| Coconut oil | 33 | 31 | 33 | 31 |
| Glycerin | 30 | 30 | 30 | 30 |
| Isophthalic acid | 40 | 40 | 40 | 40 |
| "DCZ-6018" | 2 | 4 | 2 | 4 |
| Oil length (wt. %) | 33 | 31 | 33 | 31 |
| Silicone resin content (wt. %) | 2 | 4 | 2 | 4 |
| Miscasil P-526 | — | — | 1.5 | 3 |

The figures under the columns of components I through IV in Table 1 are all in part by weight. "DCZ-6018" is an intermediate for silicone resin (trademark, product of Dow Corning, Ltd.). Miscasil P-526 is a silica powder 20 μm in average particle size (tradename, product of Mizusawa Ind. Chemicals Ltd.).

TABLE 2

| | Example | | | | Comp. Ex. |
|---|---|---|---|---|---|
| | 1 | 2 | 3 | 4 | 1 |
| Component in Table 1 | I | II | III | IV | I |
| Application film (*1) | 1 | 1 | 2 | 2 | — |
| Adhesive strength (*2) | | | | | |
| A | 2.4 | 2.4 | 2.0 | 2.0 | |
| B | 2.5-5 | 2.5-5 | 10-15 | 5-10 | |
| C | 100-120 | 100-120 | 100-110 | 100-110 | |
| D | 700-1000 | 700-1000 | 700-1000 | 700-1000 | |
| Releasability of base sheet and releasant layer | Print slightly left on base sheet side | | Good | Good | Print slightly left on base sheet side |
| Applicability to substrate | Good | Good | Good | Good | Not good (*5) |
| Marking film Appearance (*3) | Good | Good | Good | Good | Bubble occurring |

TABLE 2-continued

| | Example | | | | Comp. Ex. |
|---|---|---|---|---|---|
| | 1 | 2 | 3 | 4 | 1 |
| Gloss (*4) | 90 | 90 | 60 | 40 | 90 |

The symbols *1 to *5 in Table 2 refer to the following.

(*1) Application Film

1: Product of Dainippon Ink And Chemicals, Inc., trademark FA-1810 (Japanese paper of 100 μm in thickness/adhesive layer of 15 μm in thickness)

2: Product of Dainippon Ink And Chemicals, Inc., trademark FA-1800 (Japanese paper of 60 μm in thickness/adhesive layer of 15 μm in thickness)

(*2) Adhesive Strength (g/width 25 mm)

(A) Adhesive strength between the releasant layer and the printed layer.

(B) Adhesive strength between the release sheet and the pressure-sensitive adhesive layer.

(C) Adhesive strength between the application film and the printed layer.

(D) Adhesive strength between the aluminum panel and the pressure-sensitive adhesive layer.

(*3) Appearance

The printed film was checked for occurrence of displacement and bubbles at the marked portions. "Good" means that neither displacement nor bubble occurred.

(*4) Gloss

Specular reflectance at 60°

(*5) Particularly, difficulty was involved in positioning.

We claim:

1. A transfer sheet for marking which comprises: a release sheet, a layer of pressure-sensitive adhesive on said release sheet, a printed layer adjacent said layer of pressure-sensitive adhesive, and an application film consisting of a second adhesive layer adjacent said printed layer and a film layer adjacent said second adhesive layer, wherein said film layer is composed of material selected from the group consisting essentially of: fibers including paper, Japanese paper, unwoven fabric, and woven fabric, and plastics including polyvinyl chloride, polyester, polyethylene, polyvinyl chloride/polyvinyl acetate, polyethylene/polybutylene, polyethylene/-polyvinyl acetate, polyethylene/alkyl polyacrylate, cellulose acetate, and cellophane.

2. A transfer sheet according to claim 1, wherein a clear layer is formed between the printed layer and the application film.

3. A transfer sheet for marking which comprises: a release sheet, a layer of pressure-sensitive adhesive on said release sheet, a printed layer adjacent said layer of pressure-sensitive adhesive, and an application film which comprises a second adhesive layer adjacent said printed layer and a film layer adjacent said second adhesive layer, wherein said film layer is composed of material selected from the group consisting essentially of: fibers including paper, Japanese paper, unwoven fabric, and woven fabric, and plastics including polyvinyl chloride, polyester, polyethylene, polyvinyl chloride/-polyvinyl acetate, polyethylene/polybutylene, polyethylene/polyvinyl acetate, polyethylene/alkyl polyacrylate, cellulose acetate, and cellophane.

4. A transfer sheet according to claim 3, wherein a clear layer is formed between the printed layer and the application film.

* * * * *